(12) United States Patent
Chen

(10) Patent No.: US 6,952,342 B1
(45) Date of Patent: Oct. 4, 2005

(54) DOUBLE LOCKING DEVICE FOR REMOVABLE DISK DRIVE

(76) Inventor: Hsiu-Ling Chen, 379, Hsiton Road, Taipei Hsien, Sansia Town (TW)

(*) Notice: Subject to any disclaimer, the term of this patent is extended or adjusted under 35 U.S.C. 154(b) by 0 days.

(21) Appl. No.: 10/805,266

(22) Filed: Mar. 22, 2004

(51) Int. Cl.[7] ................................. G06F 1/16
(52) U.S. Cl. .................. 361/685; 364/708.1; 312/310; 360/98.01
(58) Field of Search ................ 361/679–687, 361/724–731; 360/742–748, 981.01; 439/377, 439/384; 312/310, 236; 364/708.1; 395/828

(56) References Cited

U.S. PATENT DOCUMENTS 6,381,139 B1 * 4/2002 Sun ........................... 361/725
6,490,153 B1 * 12/2002 Casebolt et al. ............ 361/685
6,532,150 B2 * 3/2003 Sivertsen et al. ........... 361/685

* cited by examiner

Primary Examiner—Hung Van Duong
(74) Attorney, Agent, or Firm—Troxell Law Office, PLLC

(57) ABSTRACT

This invention provides a removable computer disk drive with double locking effects that allow ejection of the handle for withdrawing the drive upon unlocking a lock apparatus and pushing a push-button, characterized in that, the removable disk drive includes an external rack that is provided with a lock apparatus on a front edge side thereof and a push-button on an outer edge thereof; the disk drive support includes a rotating handle at a front edge thereof, wherein the push-button and latch of the lock apparatus lock the rotating handle to achieve the double locking effects whereby the handle can only be ejected for withdrawing the disk drive support upon unlocking the lock apparatus and pushing the push-button.

1 Claim, 4 Drawing Sheets

DOUBLE LOCKING DEVICE FOR REMOVABLE DISK DRIVE

FIELD OF THE INVENTION

This invention relates to an enhanced security lock device that allows ejection of the handle for withdrawing the drive upon unlocking a lock apparatus and pushing a push-button.

DESCRIPTION OF THE PRIOR ART

In conventional PCs, some manufactures invented a two-unit mobile rack including an external disk drive rack to be affixed to a disk drive bay of the computer enclosure; and an internal disk drive support onto which a hard disk drive or an optical disk drive may be mounted to facilitate maintenance, replacement or portability of a disk drive to other computers upon directly mounting the disk drive to a computer enclosure. The internal disk drive support that is connected to the removable disk drive is slid along rails provided to the external disk drive rack such that the removable disk drive may be pushed in place to allow easy maintenance, replacement and portability.

In such a two-unit rack using rails for engagement or disengagement, hooks are usually provided to a handle of the disk drive support, while rabbets are provided at corresponding locations of the external rack. The engagement and positioning are achieved by rotating the handle. In addition, a lock is usually provided to the external rack for supplying electricity or preventing unauthorized access of the disk drive. The primary functions of the mobile rack are to allow the user to disengage or engage the device at any time.

This invention relates to an enhanced security lock device that allows ejection of the handle for withdrawing the drive upon unlocking a lock apparatus and pushing a push-button. The rotating handle of the disk drive support is provided with a resilient member at an end thereof and an extension block at another end thereof, where the extension block is formed with a slot and a step on a front edge thereof. The external disk drive rack is provided with a lock apparatus and a push-button at a front edge side thereof. The lock apparatus includes a latch for locking to the extension block of the rotating handle and the push-button wedges against the extension block of the rotating handle. As such, unlocking the lock apparatus and pushing the push-button will release the locking state to allow ejection of the handle for withdrawing the disk drive support, whereby achieving the intended double locking effects.

SUMMARY OF THE INVENTION

According to the enhanced security lock device of this invention, the external rack is provided with a lock apparatus which prevents the handle from ejection when the push-button is pushed due to misuse when electricity is still supplied to the disk drive by locking the lock apparatus, thereby preventing access to the disk drive. The primary objective of this invention is to prevent withdrawal of the disk drive when the computer is still under normal operation, which might cause damage to data and the disk drive. This invention is, thus, truly a disk drive security device with novelty and utility.

This invention provides a removable computer disk drive with double locking effects, characterized in that, the removable disk drive includes an external rack that is provided with a lock apparatus on a front edge side thereof and a push-button on an outer edge thereof; the disk drive support includes a rotating handle at a front edge thereof, wherein the push-button and a latch of the lock apparatus lock the rotating handle to achieve the double locking effects whereby the handle can only be ejected for withdrawing the disk drive support upon unlocking the lock apparatus and pushing the push-button.

DESCRIPTION OF THE PREFERRED EMBODIMENT

Figure 1:
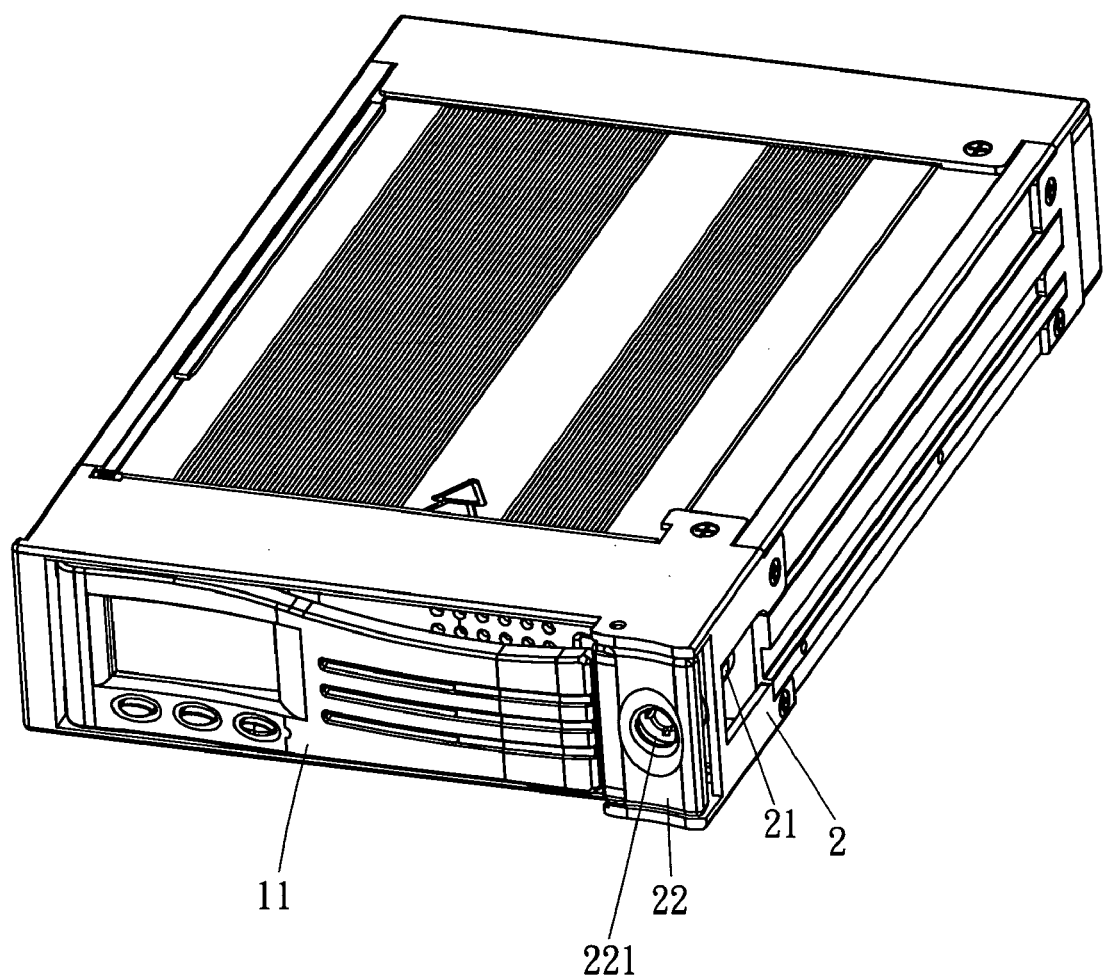
FIG. 1 is a perspective view illustrating an embodiment of a double locking device for a removable disk drive according to this invention.
Figure 2:
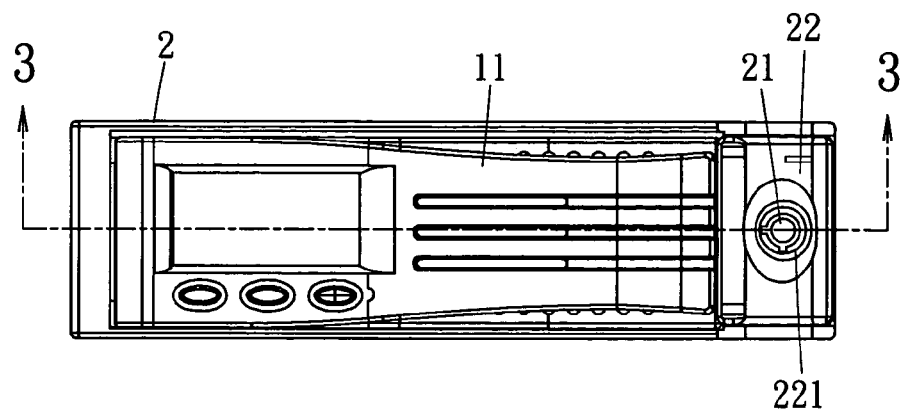
FIG. 2 is a front view of this invention.
Figure 3:
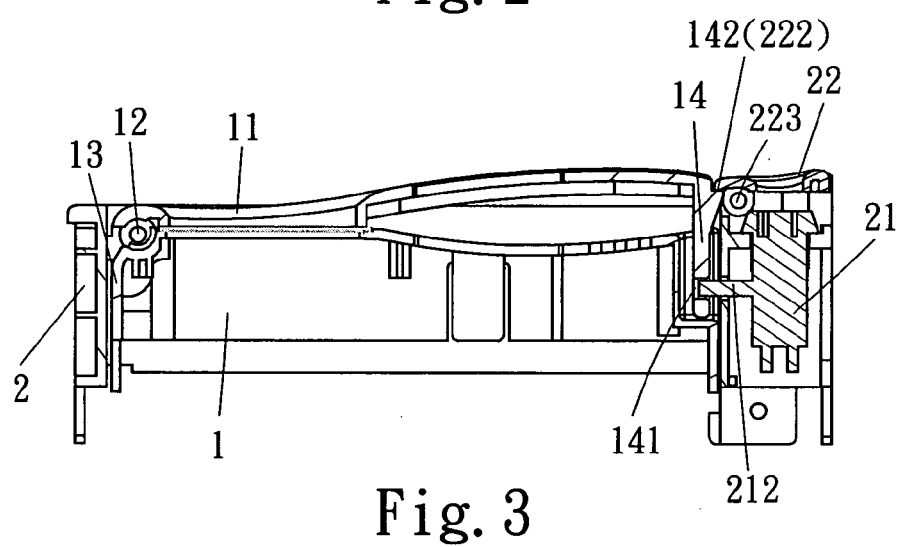
FIG. 3 is a cross-sectional view taken along the front view of FIG. 2.

FIGS. 1, 2 and 3 illustrate a double locking device for a removable disk drive according to this invention. On a front edge of a disk drive support 1 is provided with a rotating handle 11 mounted in place by a pivot 12. The rotating handle 11 includes a resilient member 13 provided at an end thereof and, such that the rotating handle 11 takes on the form of a panel that may swing about an end and includes a handle for grasping and withdrawing a disk drive support 1. The rotating handle 11 is provided at another end thereof with an extension block 14, the extension block 14 being formed thereon with a slot 141 and including a step 142 formed along a front edge thereof.

The external disk drive rack 2 in this invention is provided with a lock apparatus 21 at an inner edge of a front side edge thereof, and a push-button 22 that is mounted in place by a pivot 223 along a side of the push-button 22. The push-button 22 is formed thereon with a keyway 221 corresponding to the lock apparatus 21. The push-button 22 is provided with a wedge step 222 at a location corresponding to step 142 of the extension block 14 of the rotating handle 11. The lock apparatus 211 includes a lock shaft 211 that is projected with a latch 212 on a side thereof.

Figure 4:
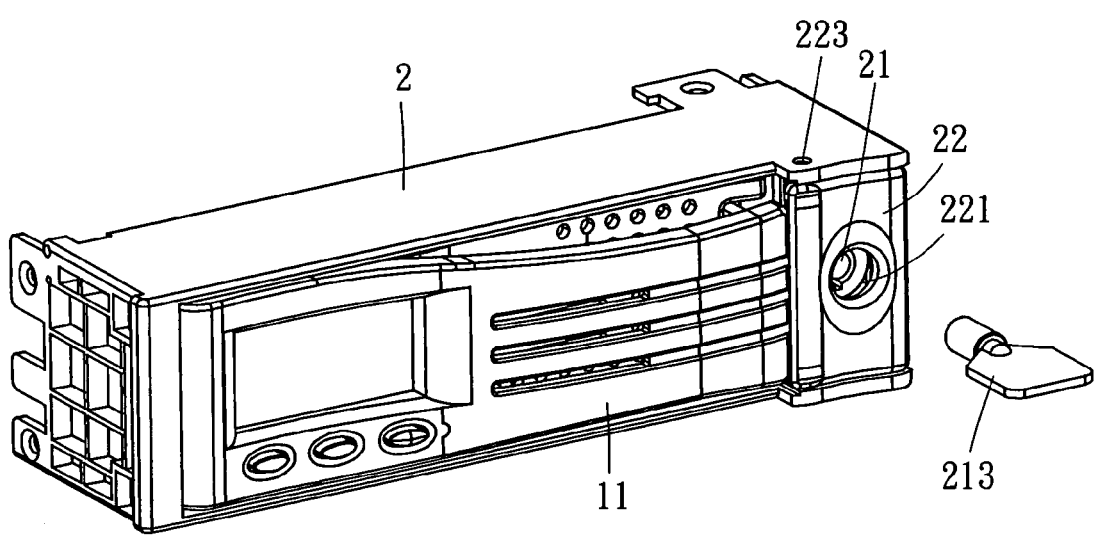
FIG. 4 is an alternative perspective view illustrating the double locking device for a removable disk drive according to this invention.
Figure 5:
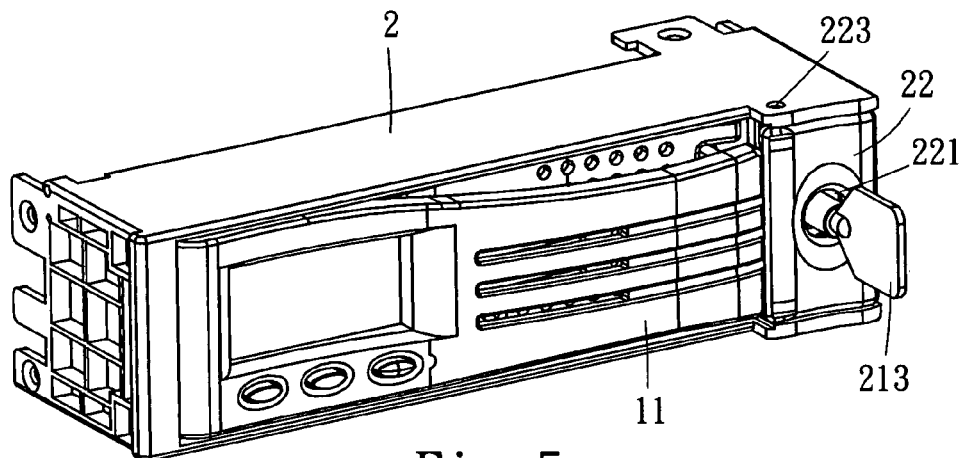
FIG. 5 is an alternative perspective view illustrating the double locking device for a removable disk drive according to this invention.
Figure 8:
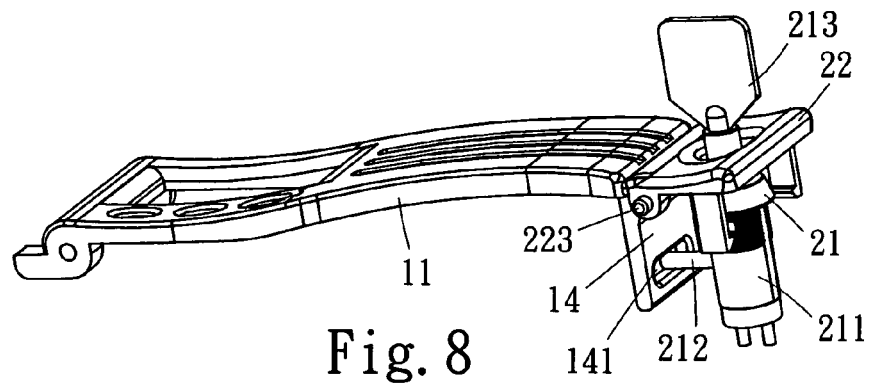
FIG. 8 is a perspective view illustrating an embodiment of the rotating handle, lock apparatus and push-button for the double locking device for a removable disk drive according to this invention.
Figure 9:
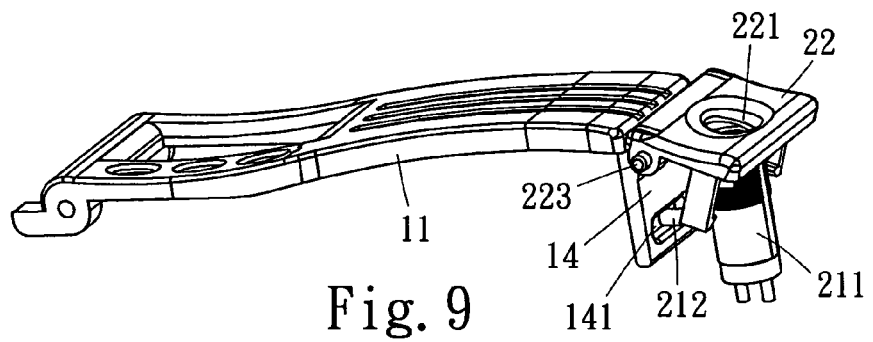
FIG. 9 is an alternative perspective view of the rotating handle, lock apparatus and push-button for the double locking device for a removable disk drive according to this invention.

FIGS. 4, 5 and 8 illustrate this invention under operation, where the rotating handle 11 has been locked and the latch 212 of the lock apparatus 21 has been rotated to enter the slot 141 of the extension block 14 to assume a locking state. Under such a state, the rotating handle 11 would not be released from the locking state even if the push-button 22 is pushed. Accordingly, this invention prevents the handle from ejection when the push-button 22 is pushed due to misuse when the electricity is still supplied to the disk drive by locking the lock apparatus, thereby preventing access to the disk drive. The primary objective of this invention is to prevent withdrawal of the disk drive when the computer is still under normal operation, which might cause damages to data and the disk drive, as shown in FIG. 9.

Figure 10:
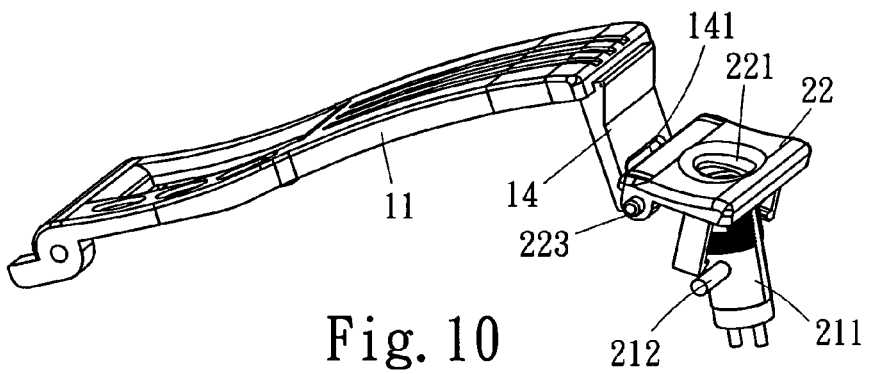
FIG. 10 is an alternative perspective view of the rotating handle, lock apparatus and push-button for the double locking device for a removable disk drive according to this invention.

As shown in FIG. 10, after inserting a key 213 into the keyway 221 of the push-button 22 thereby entering the lock apparatus 21 to rotate the lock shaft 211 of the lock apparatus 21, the latch 212 of the lock shaft 211 is moved away and released from the slot 141 of the extension block 14 of the rotating handle 11, while the lock apparatus 21 stops the electricity supply at the same time.

Figure 6:
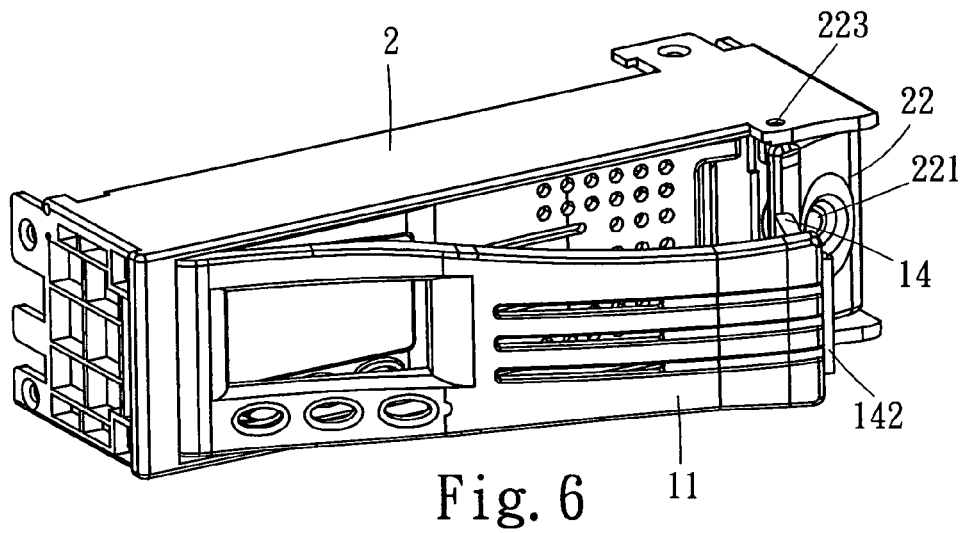
FIG. 6 is an alternative perspective view illustrating the double locking device for a removable disk drive according to this invention.
Figure 7:
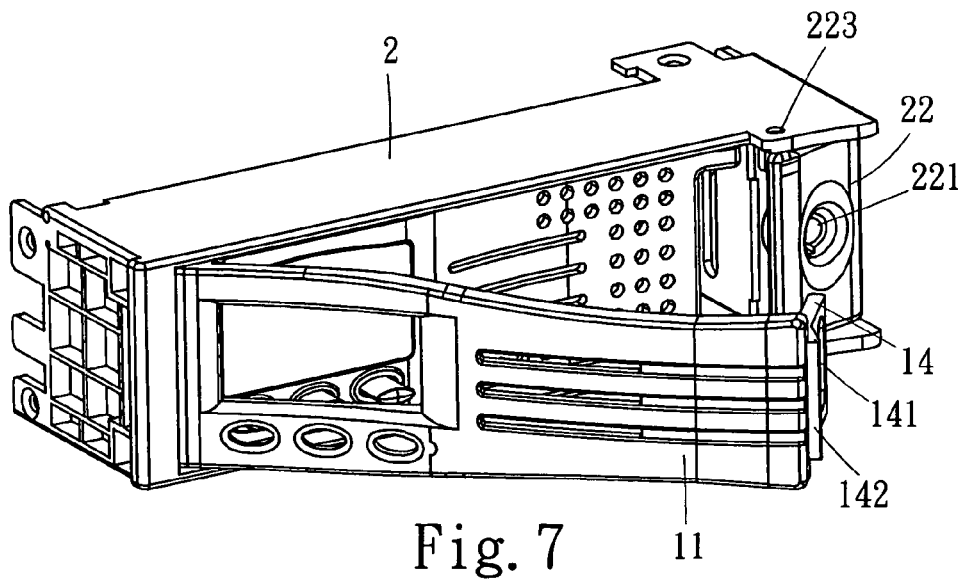
FIG. 7 is an alternative perspective view illustrating the double locking device for a removable disk drive according to this invention.
Figure 11:
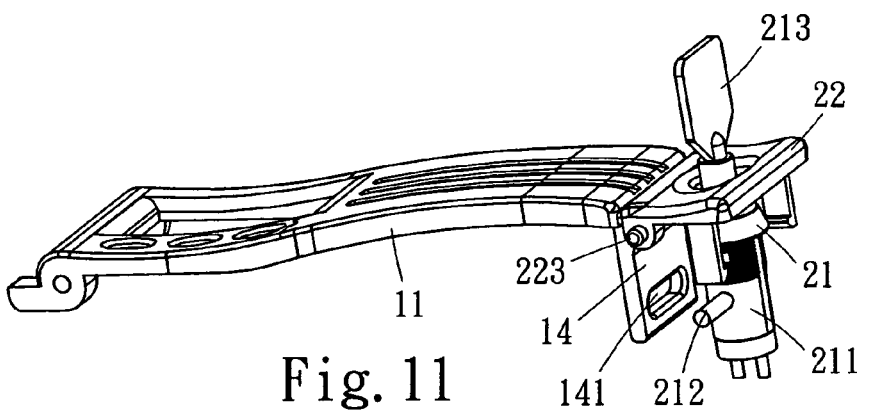
FIG. 11 is an alternative perspective view of the rotating handle, lock apparatus and push-button for the double locking device for a removable disk drive according to this invention.

Accordingly, the lock apparatus 21 is unlocked to release the locking effect that the latch 212 imposes on the extension block 14 of the rotating handle 11, as shown in FIGS. 6, 7 and 11. At this time, pushing a side of the push-button 22 would cause the wedging effect that wedge step 22 of the push-button 2 imposed upon the step 142 of the extension block 14 of the rotating handle 11, thereby allowing the handle 11 to rotate about the pivot 12 and ejected the end formed with the extension block 14 under influence of the resilient member 13. As such, the rotating handle 11 may now serve as a handle for drawing the disk drive support 1 from the external disk drive rack 2. Operations in a reverse order would allow insertion and locking of the disk drive support 1 into the external disk drive rack 2.

What is claimed is:

1. A double locking device for a removable disk drive, comprising:

a rotating handle provided on a front edge of a disk drive support, the rotating handle being mounted in place by a pivot, the rotating handle including a resilient member provided at an end thereof and an extension block provided at another end thereof, the extension block being formed thereon with a slot and including a step formed along a front edge thereof; and a lock apparatus provided at an inner edge of a front side edge of an external disk drive rack, including a push-button that is mounted in place by a pivot along a side of the push-button, the push-button being formed thereon with a keyway corresponding to the lock apparatus, the push-button being provided with a wedge step at a location corresponding to the step of the extension block of the rotating handle, the lock apparatus including a lock shaft that is projected with a latch on a side thereof;

whereby the latch of the lock apparatus and the wedge step of the push-button jointly imposes a double locking effect onto the rotating handle.

* * * * *